UNITED STATES PATENT OFFICE.

ALCIDE F. POIRRIER, DANIEL A. ROSENSTIEHL, AND ZACHARIE ROUSSIN, OF PARIS, FRANCE.

IMPROVEMENT IN COLORS FROM CRUDE NAPHTHYLAMINE.

Specification forming part of Letters Patent No. 211,180, dated January 7, 1879; application filed November 19, 1878.

*To all whom it may concern:*

Be it known that we, ALCIDE FRANÇOIS POIRRIER, manufacturing chemist, DANIEL AUGUSTE ROSENSTIEHL, chemist, and ZACHARIE ROUSSIN, chemist, all of Paris, in the Republic of France, have invented certain new Coloring-Matter Derived from Phtalamine; and we hereby declare the following to be a full, clear, and exact description of the same.

We call phtalamine an alkaloid, which accompanies crude naphthylamine, and predominates particularly in the liquid products which impregnate it. It is distinguished from the naphthylamine by its sulfo-conjugated derivative, which is soluble in water, whereas under like conditions the naphthionic acid is not soluble in water. In giving this definition, we do not wish to be understood as determining the question whether or not this body is identical with that of the same name discovered by Messrs. Schützenberger and Willm, in 1859, in crude naphthylamine.

We obtain a series of coloring-matters by starting with the phtalamine, from which we make the sulfo-conjugated derivatives, then, by means of nitrous acid, the diazoic derivatives, following in so doing the processes or methods well known to chemists. This sulfo-conjugated diazoic derivative will unite or combine directly with the phenols and the amines of all sorts to give birth to a series of new coloring-matters.

We desire to have it understood that, instead of sulfo-conjugating the phtalamine, its diazoic derivative can be prepared directly and combined with the sulfo-conjugated phenols and the amines. Or the diazoic derivative may be made to act upon the phenols and the amines of every kind. The resulting coloring-matter may then be sulfo-conjugated.

Whichever method of proceeding may be employed, a series of coloring-matters are produced.

The coloring-matters thus produced are susceptible of further transformation by the action of heat, particularly with the concurrence of water and of an alkali, or of an alkaline salt, and new and different coloring-matters are obtained. Of the latter we would specially refer to that obtained with the beta-naphthol.

This matter dies wool a very intense red, well calculated to replace "orseille" in its applications.

Having thus fully described our said invention, and the manner in which the same is or may be carried into effect, what we claim, and desire to secure by Letters Patent, is—

1. The new coloring matter or matters obtained from phtalamine, substantially as herein shown and set forth.

2. The method herein described of producing coloring-matters by the action of the sulfo-conjugated diazoic derivatives of phtalamine upon the phenols and amines or by the modifications herein shown and set forth.

3. The coloring-matters produced by the transformation of the coloring-matter before described by means of heat, with or without the addition of alkaline salt and water, substantially as shown and set forth.

In testimony whereof we have signed our names to this specification before two subscribing witnesses.

A. POIRRIER.
      A. ROSENSTIEHL.
      Z. ROUSSIN.

Witnesses:
 ROBT. M. HOOPER,
 J. ARMENGAUD, Jeune.